United States Patent Office 3,357,974
Patented Dec. 12, 1967

3,357,974
PROCESSES FOR PREPARING 16α,17α-ACETALS AND KETALS OF 16α,17α,21-TRIHYDROXY-Δ⁴-PREGNENE-3,20-DIONES
David Taub, Metuchen, N.J., assignor to Merck & Co., Rahway, N.J., a corporation of New Jersey
No Drawing. Filed Dec. 28, 1965, Ser. No. 517,065
9 Claims. (Cl. 260—239.55)

ABSTRACT OF THE DISCLOSURE

The invention herein is concerned generally with novel processes for the preparation of 16α,17α-acetals and the ketals of 16α,17α,21 - trihydroxy-Δ⁴-pregnene-3,20-dione steroids which may be oxygenated on the C-11 carbon atom and may have a fluorine atom on the C-9 carbon atom and the C-11 carbon atom is oxygenated and may also have an α-fluorine atom or an α-methyl group on the C-6 carbon atom, by reacting the corresponding 1,4-pregnadiene steroid, in which the 21-hydroxy substituent is protected by conversion to a tetrahydropyranyl-oxy substituent, with lithium in liquid ammonia thereby selectively reducing the Δ¹-unsaturated linkage and cleaving the tetrahydropranyl ether linkage on the C-21 carbon atom of the 1,2-dihydro steroid by treatment with a methanolic solution of a strong acid.

The resulting Δ⁴-steroid compounds produced by this novel method may be structurally represented as follows:

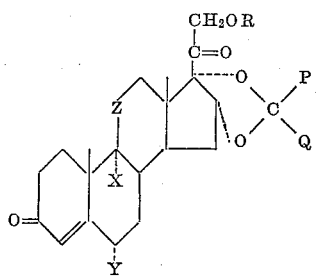

wherein R is a hydrogen atom or a tetrahydropyranyl group, X is a hydrogen or fluorine atom, Y is a hydrogen or fluorine atom, or a methyl group, Z is a methylene, β-hydroxy methylene, or carbonyl group, X being hydrogen when Z is a methylene group and P and Q are each a hydrogen atom, or an alkyl or aryl group, or together with the carbon to which they are adjoined P and Q are a cycloalkyl group.

Among the steroids which may be prepared according to the process of this invention are the 16α,17α-acetals and ketals of the following:

11β,16α,17α,21-tetrahydroxy-4-pregnene-3,20-dione;
6α-fluoro-11β,16α,17α,21-tetrahydroxy-4-pregnene-3,20-dione;
6α-methyl-11β,16α,17α,21-tetrahydroxy-4-pregnene-3,20-dione;
9α-fluoro-11β,16α,17α,21-tetrahydroxy-4-pregnene-3,20-dione;
6α,9α-difluoro-11β,16α,17α,21-tetrahydroxy-4-pregnene-3,20-dione;
6α-methyl-9α-fluoro-11β,16α,17α,21-tetrahydroxy-4-pregnene-3,20-dione;
16α,17α,21-trihydroxy-4-pregnene-3,11,20-trione;
6α-fluoro-16α,17α,21-trihydroxy-4-pregnene-3,11,20-trione;
6α-methyl-16α,17α,21-trihydroxy-4-pregnene-3,11,20-trione;
9α-fluoro-16α,17α,21-trihydroxy-4-pregnene-3,11,20-trione;
6α,9α-difluoro-16α,17α,21-trihydroxy-4-pregnene-3,11,20-trione;
6α-methyl-9α-fluoro-16α,17α,21-trihydroxy-4-pregnene-3,11,20-trione;
16α,17α,21-trihydroxy-4-pregnene-3,20-dione;
6α-fluoro-16α,17α,21-trihydroxy-4-pregnene-3,20-dione;
6α-methyl-16α,17α,21-trihydroxy-4-pregnene-3,20-dione.

The compounds prepared according to the novel process of this invention have utility in the preparation of 16-oxygenated-4-pregnene-(3,2-c) pyrazoles described in U.S. Patent No. 3,072,640, January 8, 1963, which compounds possess high anti-inflammatory activity and are especially effective for the treatment of arthritis and related diseases since they can be administered for their cortisone-like action in low dosage thereby minimizing undesirable side effects.

The starting materials for the novel process of this invention are 16α,17α-acetals and ketals of 16α,17α,21-trihydroxy-1,4-pregnadien-3,20-dione steroids which may be oxygenated on the C-11 carbon atom and may have a fluorine atom on the C-9 carbon atom if the C-11 carbon atom is oxygenated, and may also have an α-fluorine atom or an α-methyl group on the C-6 carbon atom, which may be chemically represented by the following formula:

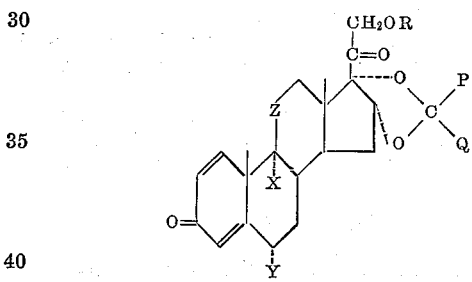

wherein R is a tetrahydropyranyl group, and X, Y, Z, P and Q have the same significance as above.

The starting materials may be prepared by etherification of the corresponding 21-hydroxy steroids by conventional methods of forming ethers. In particular, a 21-tetrahydropyranyloxy steroid may be prepared by adding the steroid to freshly distilled 2,3-dihydropyran and adding a few drops of concentrated hydrochloric acid to the suspension with stirring. The mixture is allowed to stand with stirring until the steroid is in solution and mixing is continued thereafter for two to three hours. The solution is then concentrated under reduced pressure to a viscous liquid. The residual viscous liquid is poured into cold petroleum ether with stirring and the precipitate of 21-tetrahydropyranyloxy steroid which forms may be crystallized from a suitable solvent such as ethyl acetate, aqueous acetone, aqueous methanol, or a mixture of chloroform and petroleum ether.

The novel method of this invention relates to the reduction of the Δ¹-bond of a compound coming within the scope of the starting materials as defined above. Reduction is accomplished by the use of lithium in liquid ammonia. Heretofore, a steroid to be reduced by lithium in liquid ammonia has been conventionally added to a solution of lithium in liquid ammonia. I have now discovered that the selective reduction of a Δ¹-bond in the presence of a Δ⁴-bond in a steroid of the class defined above as starting materials may be more readily accomplished and with a higher yield of reduction product if a solution of the steroid in a suitable solvent, such as tetrahydrofuran, is added to liquid ammonia and the lithium is added portion-wise to the liquid ammonia-steroid solution. The Δ¹-bond is selectively reduced by the above method. The reduction is stopped by the gradual addition of granulated ammonium chloride until the blue color of the reaction mixture disappears. The reduction product may be conveniently isolated by allowing the ammonia to evaporate, adding water, extracting the mixture with a solvent, such as a mixture of equal volumes of benzene and ether, drying the extract over magnesium sulfate, filtering, and concentrating to dryness under reduced pressure. The residue is the reduction product and may be purified by any suitable means, such as chromatography on neutral alumina or crystallization from a suitable solvent, such as methanol.

The ether linkage between the 21-carbon atom and the tetrahydropyranyl group of the reduced steroid may be split and result in a hydroxy group on the 21-carbon atom by the use of a strong mineral acid, such as concentrated hydrochloric, sulfuric or phosphoric acid. This reaction is conveniently accomplished by maintaining a solution of the 21-tetrahydropyranyl ether steroid in methanol containing concentrated mineral acid, preferably concentrated hydrochloric acid, at a temperature of from about 0° to 50° C., preferably about 25° C. The 21-hydroxy steroid may be conveniently isolated by neutralizing the reaction mixture with potassium bicarbonate, removing most of the solvent by concentration under reduced pressure, adding water to the concentrated residue and extracting with a suitable solvent, such as ethyl acetate. The extract is washed with saturated aqueous sodium chloride solution, dried over magnesium sulfate, filtered, and concentrated to dryness under reduced pressure. The residue of 21-hydroxy steroid may be purified by crystallization from a suitable solvent such as a mixture of ether and acetone and by chromatography on silica gel.

The following examples illustrate methods of carrying out the present invention, but it is to be understood that these example are given for purposes of illustration and not of limitation.

EXAMPLE 1

*9α-fluoro-11β,16α,17α, 21-tetrahydroxy-4-pregnene-3,20-dione 16α,17α-acetonide*

A solution of 1 g. of 9α-fluoro-11β,16α,17α-trihydroxy-1,4-pregnadiene-21-tetrahydropyranyloxy-3,20-dione 16α,17α-acetonide in 15 ml. of dry tetrahydrofuran is added to 80 ml. of liquid ammonia which is maintained at a temperature of from −40° C. to −50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. 770 milligrams of crude 9α-fluoro-11β,16α,17α-trihydroxy-4-pregnene - 21 - tetrahydropyranyloxy - 3,20 - dione 16α,17α-acetonide are obtained.

A solution of the crude 9α-fluoro-11β,16α,17α-trihydroxy - 4 - pregnene - 21 - tetrahydropyranyloxy - 3,20-dione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 9α-fluoro-11β,16α,17α,21-tetrahydroxy-4-pregnene-3,20-dione 16α,17α-acetonide is crystallized from a solvent composed of 90% ether and 10% acetone. 285 milligrams of crystalline product are obtained. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 9α-fluoro-11β,16α,17α,21-tetrahydroxy-4-pregnene-3,20-dione 16α,17α-acetonide is crystallized from ether containing about 10% acetone.

EXAMPLE 2

*6α,9α-difluoro-11β,16α,17α,21-tetrahydroxy-4-pregnene-3,20-dione 16α,17α-acetonide*

A solution of 1 g. of 6α,9α-difluoro-11β,16α,17α-trihydroxy - 1,4 - pregnadiene - 21 - tetrahydropyranyloxy-3,20-dione 16α,17α-acetonide in 15 ml. of dry tetrahydrofuran is added to 80 ml. of liquid ammonia which is maintained at a temperature of from −40° C. to −50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is crude 6α,9α-difluoro-11β,16α,17α-trihydroxy-4-pregnene - 21 - tetrahydropyranyloxy - 3,20 - dione 16α,17α-acetonide.

A solution of the crude 6α,9α-difluoro-11β,16α,17α-trihydroxy-4-pregnene-21-tetrahydropyranyloxy-3,20 - dione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous soduim chloride solution, dried over magnesium sulfate, filtered, and concentrated to dryness under reduced pressure. The residue of 6α,9α-difluoro-11β,16α,17α,21-tetrahydroxy-4-pregnene-3,20-dione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 6α,9α-difluoro-11β,16α, 17α,21-tetrahydroxy - 4 - pregnene-3,20-dione 16α,17α-acetonide is crystallized from ether containing about 10% acetone.

EXAMPLE 3

*6α-methyl-9α-fluoro-11β,16α,17α,21-tetrahydroxy-4-pregnene-3,20-dione 16α,17α-acetonide*

A solution of 1 g. of 6α-methyl-9α-fluoro-11β,16α,17α-trihydroxy-1,4-pregnadiene - 21 - tetrahydropyranyloxy-3,20-dione 16α,17α-acetonide in 15 ml. of dry tetrahydrofuran is added to 80 ml. of liquid ammonia which is maintained at a temperature of from −40° C. to −50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is crude 6α-methyl-9α-fluoro-11β, 16α,17α-trihydroxy - 4 - pregnene-21-tetrahydropyranyloxy-3,20-dione 16α,17α-acetonide.

A solution of the crude 6α-methyl-9α-fluoro-11β,16α, 17α-trihydroxy - 4 - pregnene-21-tetrahydropyranyloxy-3,20-dione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 6α-methyl - 9 - fluoro-11β,16α, 17α,21-tetrahydroxy - 4 - pregnene-3,20-dione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 6α-methyl - 9α - fluoro-11β,16α,17α,21-tetrahydroxy-4-pregnene-3,20-dione 16α,17α-acetonide is crystallized from ether containing about 10% acetone.

EXAMPLE 4

*16α,17α,21-trihydroxy-4-pregnene-3,20-dione 16α,17α-acetonide*

A solution of 1 g. of 16α,17α-dihydroxy-1,4-pregnadiene - 21 - tetrahydropyranyloxy-3,20-dione 16α,17α-acetonide in 15 ml. of dry tetrahydrofuran is added to 80 ml. of liquid ammonia which is maintained at a temperature of from —40° C. to —50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is 16α,17α-dihydroxy - 4 - pregnene-21-tetrahydropyranyloxy-3,20-dione 16α,17α-acetonide.

A solution of the crude 16α,17α-dihydroxy-4-pregnene-21-tetrahydropyranyloxy - 3,20 - dione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 16α, 17α,21-trihydroxy - 4 - pregnene-3,20-dione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 16α,17α, 21-trihydroxy-4-pregnene-3,20-dione 16α,17α-acetonide is crystallized from ether containing about 10% acetone.

EXAMPLE 5

*6α-fluoro-16α,17α,21-trihydroxy-4-pregnene-3,20-dione 16α,17α-acetonide*

A solution of 1 g. of 6α-fluoro-16α,17α-dihydroxy-1,4-pregnadiene-21-tetrahydropyranyloxy-3,20-dione 16α,17α-acetonide in 15 ml. of dry tetrahydrofuran is added to 80 ml. of liquid ammonia which is maintained at a temperature of from —40° C. to —50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extractad with an extraction solvent composed of equal amounts by volume of benzene and ether. The extract is dried over magnesium sulfate, filtered and concentrated to dryness under reduced pressure. The residue is crude 6α-fluoro-16α,17α-dihydroxy - 4 - pregnene-21-tetrahydropyranyloxy-3,20-dione 16α,17α-acetonide.

A solution of the crude 6α-fluoro-16α,17α-dihydroxy-4-pregnene-21-tetrahydropyranyloxy - 3,20 - dione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 6α-fluoro-16α,17α,21-trihydroxy-4-pregnene-3,20-dione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 6α-fluoro-16α,17α,21-trihydroxy-4-pregnene-3,20-dione 16α,17α-acetonide is crystallized from ether containing about 10% acetone.

EXAMPLE 6

*6-methyl-16α,17α,21-trihydroxy-4-pregnene-3,20-dione 16α,17α-acetonide*

A solution of 1 g. of 6α-methyl-16α,17α-dihydroxy-1,4-pregnadiene-21-tetrahydropyranyloxy-3,20-dione 16α,17α-acetonide in 15 ml. of dry tetrahydrofuran is added to 80 ml. of liquid ammonia which is maintained at a temperature of from —40° C. to —50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is crude 6α-methyl-16α,17α-dihydroxy-4-pregnene - 21 - tetrahydropyranyloxy-3,20-dione 16α,17α-acetonide.

A solution of the crude 6α-methyl-16α,17α-dihydroxy-4-pregnene-21-tetrahydropyranyloxy-3,20-dione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 6α-methyl-16α,17α,21-trihydroxy-4-pregnene-3,20-dione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 6α-methyl-16α,17α,21-trihydroxy-4-pregnene-3,20-dione 16α,17α-acetonide is crystallized from ether containing about 10% acetone.

EXAMPLE 7

16α,17α,21-trihydroxy-4-pregnene-3,11,20-trione 16α,17α-acetonide

A solution of 1 g. of 16α,17α-dihydroxy-1,4-pregnadiene-21-tetrahydropyranyloxy - 3,11,20-trione 16α,17α-acetonide in 15 ml. of dry tetrahydrofuran is added to 80 ml. of liquid ammonia which is maintained at a temperature of from —40° C. to —50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is crude 16α,17α-dihydroxy-4-pregnene-21-tetrahydropyranyloxy-3,11,20-trione 16α,17α-acetonide.

A solution of the crude 16α,17α-dihydroxy-4-pregnene-21-tetrahydropyranyloxy-3,11,20 - trione 16α,17α-acetonide in 30 ml. of methanol containing 0.3 ml. of concentrated hydrochloric acid is kept at a temperature of 25° C. for 90 minutes. Solid potassium bircarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 16α,17α,21-trihydroxy-4-pregnene-3,11,20-trione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 16α,17α,21-trihydroxy-4-pregnene-3,11,20-trione 16α,17α-acetonide is crystallized from ether containing about 10% acetone.

EXAMPLE 8

9α-fluoro-16α,17α,21-trihydroxy-4-pregnene-3,11,20-trione 16α,17α-acetonide

A solution of 1 g. of 9α-fluoro-16α,17α-dihydroxy-1,4-pregnadiene - 21 - tetrahydropyranyloxy - 3,11,20 - trione 16α,17α-acetonide in 15 ml. of dry tetrahydrofuran is added to 80 ml. of liquid ammonia which is maintained at a temperature of from —40° C. to —50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is crude 9α-fluoro-16α,17α-dihydroxy-4 - pregnene - 21 - tetrahydropyranyloxy - 3,11,20 - trione 16α,17α-acetonide.

A solution of the crude 9α-fluoro-16α,17α-dihydroxy-4-pregnene - 21 - tetrahydropyranyloxy - 3,11,20 - trione 16α,17α-acetonide in 20 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 9α-fluoro-16α,17α,21-trihydroxy-4-pregnene-3,11,20-trione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 9α-fluoro-16α,17α,21-trihydroxy-4-pregnene-3,11,20-trione 16α,17α-acetonide is crystallized from ether containing about 10% acetone.

EXAMPLE 9

6α,9α-difluoro-16α,17α,21-trihydroxy-4-pregnene-3,11,20-trione 16α,17α-acetonide A solution of 1 g. of 6α,9α-difluoro-16α,17α-dihydroxy-1,4 - pregnadiene - 21 - tetrahydropyranyloxy - 3,11,20 - trione 16α,17α-acetonide in 15 ml. of dry tetrahydrofuran is added to 80 ml. of liquid ammonia which is maintained at a temperature of from —40° C. to —50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is crude 6α,9α-difluoro-16α,17α-dihydroxy - 4 - pregnene - 21 - tetrahydropyranyloxy - 3,11,20 - trione 16α,17α-acetonide.

A solution of the crude 6α,9α-difluoro-16α,17α-dihydroxy - 4 - pregnene-21 - tetrahydropyranyloxy - 3,11,20-trione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extract is washed with saturated aqueous sodium chloride solution, dried over magnesium sulfate, filtered, and concentrated to dryness under reduced pressure. The residue of 6α,9α-difluoro-16α,17α,21-trihydroxy-4-pregnene-3,11,20-trione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 6α,9α - difluoro - 16α,17α,21 - trihydroxy - 4-pregnene-3,11,20-trione 16α,17α-acetonide is crystallized from ether containing about 10% acetone.

EXAMPLE 10

*6α-methyl-9α-fluoro-16α,17α,21-trihydroxy-4-pregnene 3,11,20-trione 16α,17α-acetonide*

A solution of 1 g. of 6α-methyl-9α-fluoro-16α,17α-dihydroxy - 1,4 - pregnadiene - 21 - tetrahydropyranyloxy-3,11,20-trione 16α,17α-acetonide in 15 ml. of dry tetrahydrofuran is added to 80 ml. of liquid ammonia which is maintained at a temperature of from −40° C. to −50° C. The mixture is stirred and 10 mg. of lithium ribbon is added followed by the addition of a second 10 mg. portion of lithium ribbon after 2 minutes. Three minutes after the addition of the second portion of lithium ribbon, granulated ammonium chloride is added until the blue color of the reaction mixture disappears. The ammonia is allowed to evaporate and 50 ml. of water are added. The diluted reaction mixture is extracted with an extraction solvent composed of equal amounts by volume of benzene and ether. The extract is dried over magnesium sulfate, filtered and concentrated to dryness under reduced pressure. The residue is 6α-methyl-9α-fluoro-16α,17α-dihydroxy-4-pregnene - 21-tetrahydropyranyloxy-3,11,20-trione 16α,17α-acetonide.

A solution of the crude 6α-methyl-9α-fluoro-16α,17α-dihydroxy-4-pregnene - 21 - tetrahydropyranyloxy-3,11,20-trione 16α,17α-acetonide in 30 ml. of methanol containing 0.3 ml. of concentrated hydrochloric acid is kept at a temperature of 25° C. for 90 minutes. Solid potassium bicarbonate is added in an amount sufficient to neutralize the reaction mixture and the neutralized reaction mixture is concentrated almost to dryness by distilling off the methanol under reduced pressure. 50 milliliters of water are added to the residue and the mixture is extracted with ethyl acetate. The extracted is washed with saturated aqueous sodium chloride solution, dried over magnesium sulfate, filtered, and concentrated to dryness under reduced pressure. The residue of 6α-methyl-9α-fluoro-16α,17α,21 - trihydroxy-4-pregnene - 3,11,20-trione 16α,17α-acetonide is crystallized from a solvent composed of 90% ether and 10% acetone. The product remaining in the mother liquor is purified by chromatography on silica gel plates using chloroform containing 2% methanol as a developing solvent. The band containing the product is removed from the silica gel plate and triturated with acetone. The acetone solution is filtered and concentrated to dryness under reduced pressure. The residue of 6α-methyl-9α-fluoro-16α,17α,21-trihydroxy-4-pregnene-3,11,20-trione 16α,17α-acetonide is crystallized from ether containing about 10% acetone.

I claim:
1. A process for the preparation of a compound of the formula:

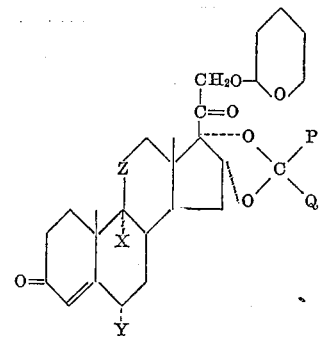

wherein X is hydrogen or fluorine, Y is hydrogen, fluorine, or methyl, Z is methylene, β-hydroxy methylene, or a carbonyl group, X being hydrogen when Z is a methylene group, and P and Q are each hydrogen, or an alkyl or aryl group, or together with the carbon to which they are joined, P and Q are a cycloalkyl group, which comprises reducing a compound of the formula:

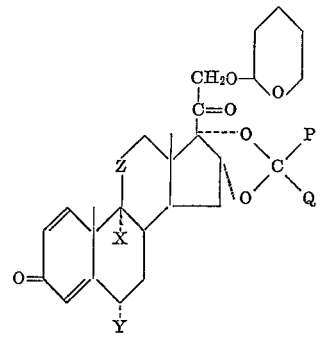

wherein X, Y, Z, P, and Q have the same significance as above, by adding a solution thereof in an organic solvent to liquid ammonia and adding lithium gradually to the liquid ammonia-steroid solution.

2. A process according to claim 1 in which X is hydrogen, Y is hydrogen, Z is β-hydroxy methylene, and P and Q are each methyl.

3. A process according to claim 1 in which X is hydrogen, Y is fluorine, Z is β-hydroxy methylene, and P and Q are each methyl.

4. A process according to claim 1 in which X is hydrogen, Y is methyl, Z is β-hydroxy methylene, and P and Q are each methyl.

5. A process according to claim 1 in which X is fluorine, Y is fluorine, Z is β-hydroxy methylene, and P and Q are each methyl.

6. A process according to claim 1 in which X is fluorine, Y is methyl, Z is β-hydroxy methylene, and P and Q are each methyl.

7. A process according to claim 1 in which X is hydrogen, Y is hydrogen, Z is carbonyl, and P and Q are each methyl.

8. A process according to claim 1 in which X is hydrogen, Y is fluorine, Z is carbonyl, and P and Q are each methyl.

9. A process according to claim 1 in which X is hydrogen, Y is hydrogen, Z is methylene, and P and Q are each methyl.

References Cited
UNITED STATES PATENTS 3,042,670 7/1962 Shapiro et al. ____ 260—239.55
3,116,304 12/1963 Taub et al. _____ 260—397.45

OTHER REFERENCES

Wilds et al., J. Amer. Chem. Soc., 75, 5366–5369 (1953) QD 1 A5 (page 5367 relied on).

LEWIS GOTTS, *Primary Examiner.*

T. MESHBESHER, *Assistant Examiner.*